United States Patent [19]

Mori et al.

[11] Patent Number: 5,014,143
[45] Date of Patent: May 7, 1991

[54] DATA RECORDING DISK CHUCK MECHANISM

[75] Inventors: Kyoichi Mori, Hiratsuka; Kuniaki Toda, Sagamihara; Nobuyuki Iizuka; Tsutomu Hongo, both of Kanagawa; Tsutomu Nakadai, Yokohama, all of Japan

[73] Assignee: Hitachi Electronics Engineering Co., Ltd., Tokyo, Japan

[21] Appl. No.: 500,454

[22] Filed: Mar. 28, 1990

[30] Foreign Application Priority Data

Mar. 31, 1989 [JP] Japan .................................. 1-81018
Dec. 21, 1989 [JP] Japan .................................. 1-147608[U]

[51] Int. Cl.⁵ .......................................... G11B 25/04
[52] U.S. Cl. .................................. 360/99.12; 369/270
[58] Field of Search ........................ 360/99.12, 99.05; 369/270-271

[56] References Cited

U.S. PATENT DOCUMENTS

| | | | |
|---|---|---|---|
| 4,347,599 | 8/1982 | Vitale | 369/270 |
| 4,562,570 | 12/1985 | Denton | 369/270 |
| 4,570,255 | 2/1986 | Van Alem et al. | 360/99.12 X |
| 4,755,981 | 7/1988 | Ekhoff | 369/270 |
| 4,786,997 | 11/1988 | Funabashi et al. | 360/99.12 X |
| 4,898,397 | 2/1990 | Smith | 369/271 X |
| 4,958,839 | 9/1990 | Guzik | 369/271 X |

FOREIGN PATENT DOCUMENTS 59-33682  2/1984  Japan ............................... 360/99.12

Primary Examiner—John H. Wolff
Attorney, Agent, or Firm—Fay, Sharpe, Beall, Fagan, Minnich & McKee

[57] ABSTRACT

A disk chuck mechanism for chucking a disk in a stepped-down portion of a rotary chuck member and releasing the disk by vertically moving a chuck head coupled to an operating shaft is disclosed wherein a ring member having a cut in part is provided for its diameter to be enlarged opposite to the stepped-down portion of the rotary chuck member for chucking the disk and biased in the direction in which its diameter contracts. The chuck head is moved in the axial direction to utilize an inclined side face of the chuck head to enlarge the diameter of the ring member. With this arrangement, it is ensured that the disk is chucked in between the stepped-down portion of the rotary chuck member and the ring member with the one stroke movement of the chuck head.

11 Claims, 3 Drawing Sheets

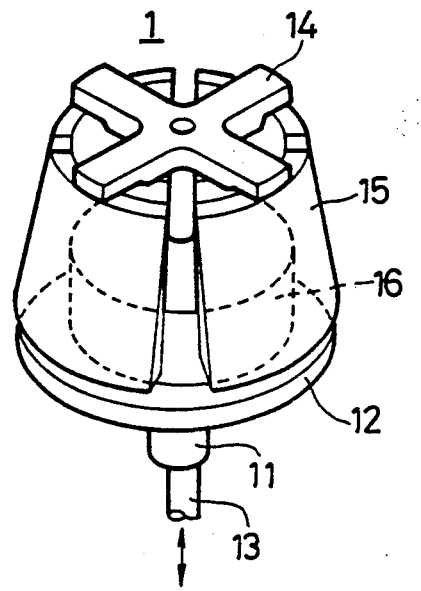
Fig.1 (a) (PRIOR ART)
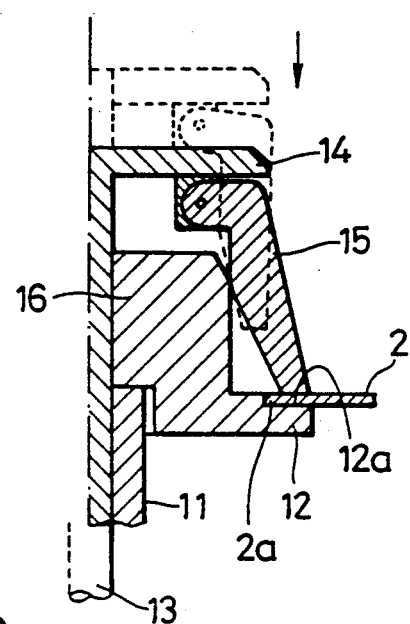
Fig.1 (b) (PRIOR ART)
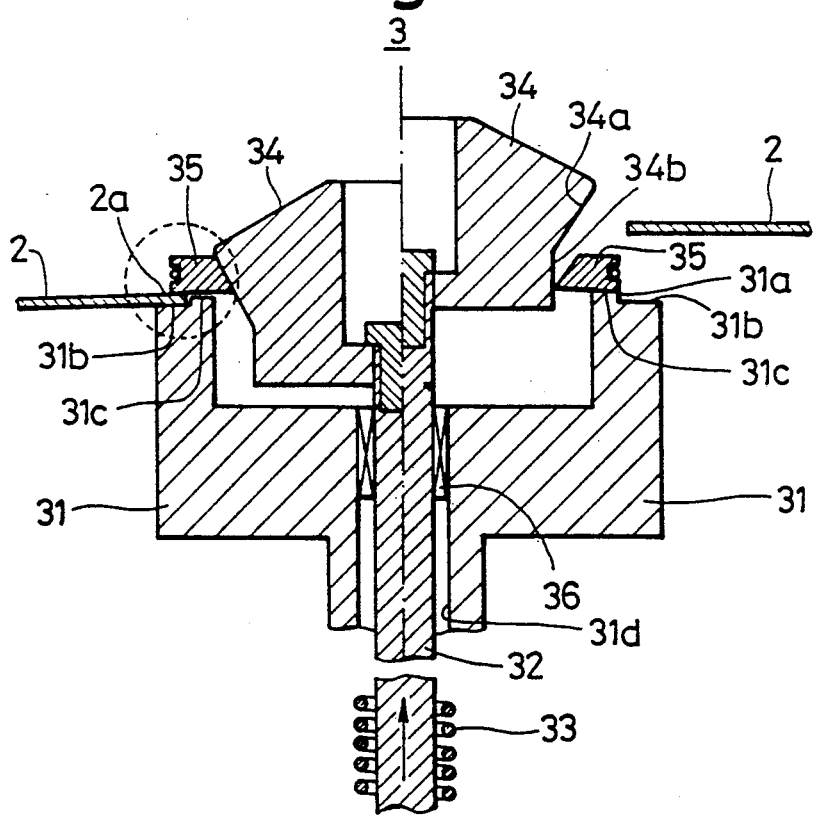
Fig.2

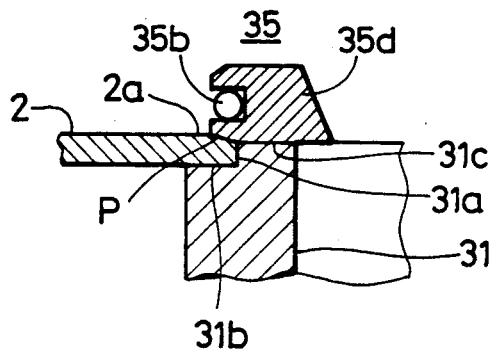
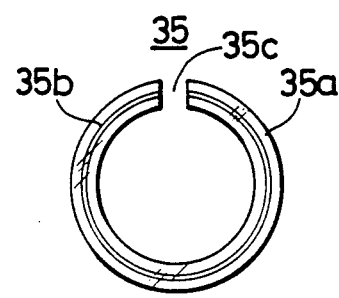
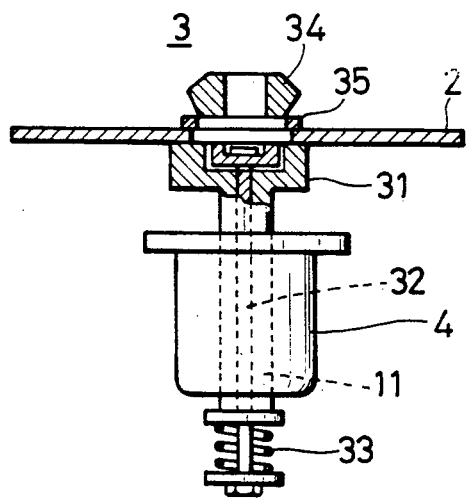

DATA RECORDING DISK CHUCK MECHANISM

TECHNICAL FIELD

The present invention relates to data recording disk chuck mechanisms in disk drives of magnetic disk test equipment. More particularly, the present invention relates to improvements in magnetic disk chuck mechanisms to ensure that a small diameter magnetic disk can be chucked by a chuck member coupled to a spindle at one stroke.

PRIOR ART

Magnetic disks (hereinafter referred to as simply the "disk(s)") for use in information processors have a circular opening in the central part, the circular opening being used when the magnetic disk is fitted to a rotary chuck member therethrough. The disk is fitted to such a rotary chuck member of a magnetic disk drive for testing purposes during the process of manufacture to make various tests for electric performance and the like. When the disk is tested, it is chucked on a turntable as the rotary chuck member of a magnetic disk drive mechanism and driven to rotate by a spindle motor.

In magnetic disk test equipment, a number of disks are mounted one after another for testing. For this reason, the disk chuck mechanism in the disk drive is desired to be so arranged that any disk is readily attached to and detached from the turntable and that the chucking of the disk is assured.

FIG. 1(a) is a perspective view of a construction of a disk chuck mechanism in a built-in magnetic disk drive of conventional magnetic disk test equipment and FIG. 1(b) is a sectional view of the complementary half thereof with the center line as a boundary.

As shown in FIGS. 1(a) and 1(b), the disk chuck mechanism 1 has a hollow circular turntable 12 fixed to the spindle 11 of a spindle motor. The turntable 12 is fitted with a circular guide hub 16 having an axis common therebetween and an axial through-hole is provided in the central part of the spindle 11 and that of the guide hub 16. An operating shaft 13 for use in chucking and releasing the disk is passed through the hole in such a manner that the shaft is movable in the axial (vertical) direction. A chuck head is fitted to the leading end of the operating shaft 13. The chuck head is circular in transverse cross section, i.e., the section cut in the horizontal direction.

The chuck head comprises a cross-shaped support arm 14 secured to the leading end of the operating shaft 13 and four chuck pieces 15 hanged from the undersides of respective arm portions of the support arm 14. The chuck piece 15 is formed by quartering a cylinder into a quadrant, which is pivotally fitted via a pin or the like to the underside of the leading end of each arm portion of the support arm 14 in such a manner that the lower portion of the chuck piece can be turned outward. As shown in FIG. 1(b), the chuck pieces 15 constitute a chuck member on one side, leading ends of the chuck pieces being used for chucking a disk 2 by pressing the inner periphery 2a (the surface to be pressed for chucking) along the central opening of the disk 2. While the chuck pieces 15 keep chucking the disk 2 (see FIG. 1(b)), part of the inner wall surface of each chuck piece 15 contacts the exterior of the guide hub 16, whereas the trailing end of the chuck piece remains fixed as it is contacted with the underside of the leading end of the arm portion.

With this arrangement, the support arm 14 is elevated as shown by a dotted line of FIG. 1(b) when the operating shaft 13 is forced up. Simultaneously, the chuck pieces 15 turn inward (clockwise in the drawing) by their own weight as if an umbrella is folded. The leading ends of the chuck pieces 15 are then released from the inner periphery of the disk 2, which is then set free and made upwardly removable from the turntable 12. At the same time, another disk 2 may be mounted on the turntable 12 in this condition.

While the chuck pieces 15 are folded like an umbrella as shown by the dotted line, the mounting of the disk 2 on the turntable 12 is carried out by lowering it onto the turntable from above with the outer peripheries of the chuck pieces 15 as a guide through the central opening formed therein. When the disk 2 is thus lowered, the inner periphery 2a of the disk 2 mates with the stepped-down portion 12a provided on the outer periphery of the turntable. Then the operating shaft 11 is lowered and the insides of the chuck pieces 15 contact the upper portion of the outer periphery of the guide hub 16. The chuck pieces 15 are thereby pressed open outwardly and moved down up to the position shown by a straight line of FIG. 1(b). The inner periphery 2a of the disk 2 as what is to be pressed is thus pressed against the turntable 12 and chucked on the turntable 12 at one stroke.

The aforementioned arrangement indicates an example of the chuck head having four cross-shaped chuck pieces. When the disk 2 is large in size, however, five or more than five chuck pieces may be used. With the simultaneous use of a handling mechanism (not shown) for conveying disks up to such a disk chuck mechanism, a series of operations including conveying and chucking disks, and removing them from the chuck mechanism has been automated.

The disk chuck mechanism thus constructed is convenient as long as it is used for handling relatively large diameter disks; however, the disadvantage is that such a disk chuck mechanism is hardly reducible in size as it requires the cross-shaped support arm 14 and four or more than four chuck pieces 15.

On the other hand, the recent tendency is for magnetic disks to be increasingly reduced in size and some of them for use have an external diameter of 65 mm and a central opening of 20 mm in diameter. In other words, it is hardly possible to use a chuck mechanism of the aforementioned construction for such small diameter disks. Even though the number of chuck pieces is decreased to three, the machining and assembly of the chuck mechanism become difficult because the component members have to be also extremely small. When the chuck pieces are thus reduced in size, it is still problematic whether the chucking and releasing operations associated with a link mechanism are assured.

SUMMARY OF THE INVENTION

An object of the present invention is to provide a chuck mechanism that allows disks to be readily chucked and released.

Another object of the present invention is to provide a magnetic disk chuck mechanism simple in construction and capable of ensuring that disks are chucked without using a link mechanism and easily released.

Still another object of the present invention is to provide a magnetic disk chuck mechanism capable of ensuring that a disk is chucked with the force uniformly applied to the substantially whole inner periphery thereof at one axial stroke and released after being chucked.

A further object of the present invention is to provide a magnetic disk chuck mechanism which is simple in construction, in a magnetic disk drive of magnetic disk test equipment, and capable of mounting or dismounting a small-sized magnetic disk in one stroke operation.

The foregoing objects of the present invention can be accomplished by providing a data recording disk chuck mechanism of the following construction.

More specifically, in the disk chuck mechanism arranged so that a disk is chucked on a stepped-down portion of a rotary chuck member or released therefrom by vertically moving a chuck head coupled to an operating shaft, there is provided a ring member whose diameter is caused to enlarge in the direction opposite to the stepped-down portion of the rotary chuck member for chucking the disk. The ring member, part of which is cut out, is kept biased in the direction in which its diameter contracts. Moreover, the chuck head is axially moved to utilize its inclined side formed thereon to enlarge the diameter of the ring member. Consequently, the one stroke of the chuck head ensures that the disk is chucked in between the stepped-down portion of the rotary chuck member and the ring member.

With this chuck mechanism, while the chuck ring and the chuck head are in separate relationship to each other, it is only necessary to provide the chuck head with the inclined outer peripheral side set diagonally opposite to the rotary chuck member. A special rotary mechanism such as a link mechanism can be dispensed with in this case. Moreover, the ring member biased in the direction in which its diameter contracts can be made an independent separate member. On condition that the ring member is fitted to the inclined side of the chuck head where the diameter is small, the disk is automatically removed from the stepped-down portion of the rotary chuck member with the corresponding biasing force to ensure that the disk is released. The chuck mechanism can thus be made compact.

The ring member is preferably made of flexible plastic material, e.g., formed with a nylon ring which is almost free from producing dust due to friction and unlikely to leave chuck markings on the disk thus chucked. In addition, the inner peripheral side face of the ring member making contact with the outer inclined peripheral side face of the chuck head should have an angle in agreement with that of the inclined side face of the chuck head. The arrangement of biasing the ring member to contract its diameter may be simplified further if a steel ring or O-ring is fitted from the outside along the outer periphery of the chuck head.

BRIEF DESCRIPTION OF THE DRAWINGS

FIGS. 1(a) and 1(b) are perspective and sectional views of a construction of a disk chuck mechanism in a magnetic disk drive of conventional magnetic disk test equipment and the complementary half thereof with the center line as a boundary, respectively.

FIG. 2 is a diagram illustrating a chuck mechanism in a magnetic disk drive of magnetic disk test equipment as an embodiment of the present invention, with the halves separated from each other with the center line as a boundary to show disks in the chucked and released conditions, respectively.

FIG. 3 is a diagram illustrating the chuck ring in the disk chuck mechanism shown in FIG. 2.

FIG. 4 is an enlarged view of the portion enclosed with a cutaway circle of FIG. 2.

FIG. 5 is an overall diagram illustrating the disk drive mechanism including a spindle motor having the disk chuck,,mechanism of FIG. 2.

DESCRIPTION OF THE PREFERRED EMBODIMENT

Figure 6:
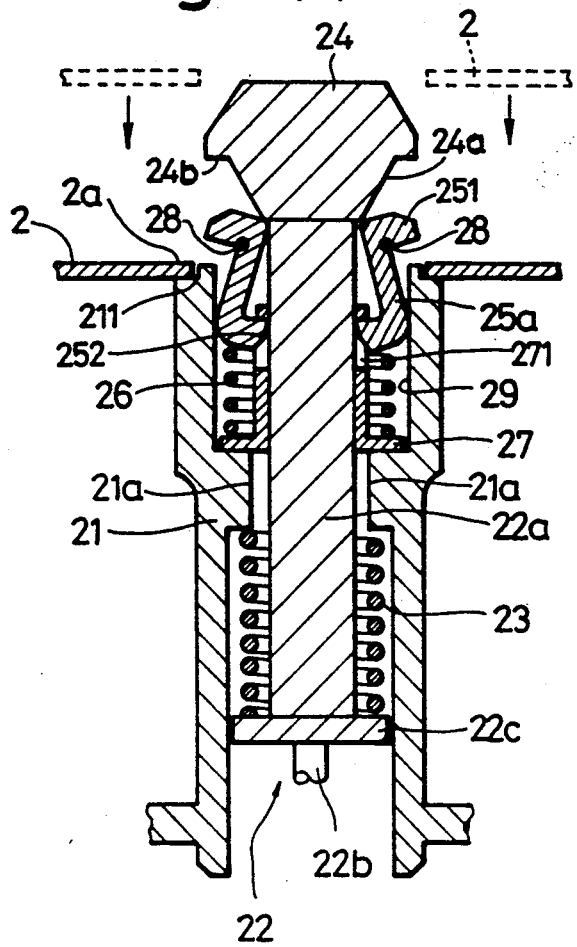
FIGS. 6(a), 6(b) and 6(c) are sectional and perspective views of another disk chuck mechanism and its chuck member, respectively.
Figure 6:
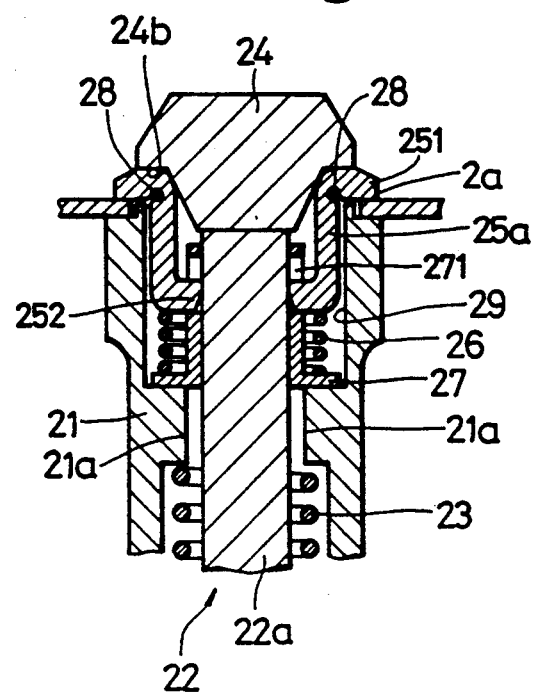
Figure 6:
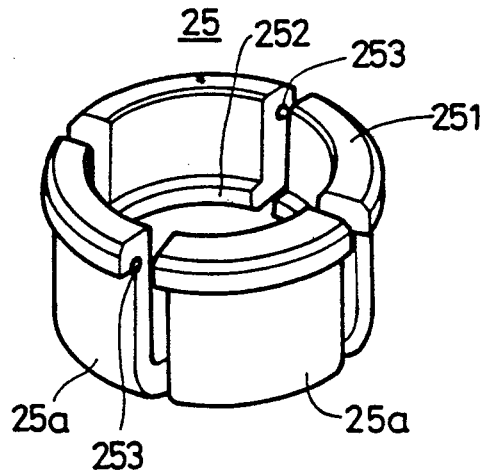

FIG. 2 shows a disk chuck mechanism 3 in a built-in magnetic disk drive of magnetic disk test equipment, wherein a turntable 31 is coupled to a spindle 11 (not shown in FIG. 2) shown in FIG. 1. The turntable 31 is a chuck member on one side of the chuck mechanism. A difference in level, i.e., a step 31a is provided on the outer periphery of the turntable 31, whereby a stepped-down portion 31b is formed thereon. A disk 2 to be chucked on the turntable 31 is conveyed by a disk handling mechanism (not shown). The disk 2 thus conveyed is set down from above the turntable 31 to the stepped-down portion 31b of the turntable 31 with the inner periphery 2a (to be chucked) of the disk 2 being mated therewith.

An operating shaft 32 is supported by a bearing member 36 fitted into a through-hole 31d of the turntable and remains inserted therein in such a manner that it is movable in the axial (vertical) direction with respect to the turntable 31 and the spindle 11. The operating shaft 32 is also biased by a coil spring 33 downwardly along its axis. A chuck head 34 is secured to the leading end of the operating shaft 32. The right half portion of FIG. 2 with the center as a boundary shows the chuck head 34 elevated (the disk being released), whereas the left half portion shows the chuck head 34 used to chuck the disk 2 as the operating shaft 32 is lowered.

The vertical movement of the chuck head 34 is made by the actuation of an air cylinder (the drive mechanism not shown) and the operating shaft 32 is caused to move up against the biasing force of the coil spring 33 so as to elevate the chuck head. On the other hand, the chuck head 34 is caused to move down by the biasing force of the coil spring 33. While the operating shaft 32 is moving down, the chuck head 34 keeps applying pressure to a chuck ring 35, which will be described later, because of the biasing force derived from the coil spring 33. The chuck ring 35 is made a chuck member on the other side in contrast to the turntable 31.

As shown in an overall diagram of FIG. 5, the coil spring 33 is disposed opposite to the turntable 31 with a spindle motor 4 therebetween. The spindle 11 of the spindle motor 4 is passed through a case accommodating the spindle motor 4 and the coil spring 33 is fitted to the operating shaft 32 between a collar provided at its protruded end under the spindle motor 4 and another provided at the protruded end of the spindle 11 coupled to the operating shaft 32.

The maximum outer diameter of the chuck head 34 is arranged slightly smaller than the diameter of the opening in the central part of the disk 2 and the chuck head is provided with an inclined outer peripheral side face 34a diagonally opposite to the turntable 31. The side face 34a is inclined in such a manner that the diameter of the chuck head is gradually decreased toward the turntable 31 simultaneously with its own center. The inclined side face 34a consecutively abuts on a downward cylindrical portion 34b.

The chuck ring 35 is disposed between the chuck head 34 and the turntable 31. The chuck ring 35 is fitted to the cylindrical portion 34b and, as shown in FIG. 3, formed with a flexible nylon ring 35a substantially free from producing dust due to friction and a resilient steel ring 35b embedded in the ring along the outer periphery thereof from the outside. The chuck ring 35 containing the steel ring 35b has a partial cut 35c. Although the built-in steel ring 35b of FIG. 3 has been drawn to appear observable for convenience of illustration, whether or not the steel ring 35b can be seen from the outside is dependent on the material of which the chuck ring 35 is made. FIG. 4 is a partial sectional view illustrating the relationship among the chuck ring, the disk and the turntable. The chuck ring 35 before being fitted may be substantially equal in diameter to or slightly greater in diameter than the cylindrical portion 34b. If, however, the diameter is otherwise smaller than that of the cylindrical portion, the enlarged diameter will quickly return to the original measurement. Despite this advantage, the friction between the chuck ring 35 and the cylinder portion 34b of the chuck head 34 tends to increase. The diameter of the chuck ring 35 before it is fitted to the cylindrical portion 34b may properly be determined in consideration of the aforementioned relationship.

The steel ring 35b is made of elastic material to provide it with strong elastic properties, whereby when the diameter of the chuck ring 35 is subsequently enlarged from the condition shown in FIG. 3, the chuck ring is biased so that it returns to the condition shown in FIG. 3. In this condition or what is close thereto, the chuck ring 35 is fitted to the cylindrical portion 35b and held on a surface 31c inside the step 31a of the turntable 31. At this time, the leading end of the chuck ring 35 is not yet caused to protrude from the step 31a toward the stepped-down portion 31b.

A description will subsequently be given of the operation of enlarging the diameter of the chuck ring 35. First, the operating shaft 32 is elevated by a suitable drive mechanism such as an air cylinder against the biasing force of the coil spring 33 and located as shown in the right half portion of FIG. 2. Then the inner periphery 2a of the disk 2 is mounted on the stepped-down portion 31b of the turntable 21. When air is released from the air cylinder, the operating shaft is lowered because of the coil spring 33 as shown in the left half portion of FIG. 2. The inclined side face 35d of the chuck ring 35 is thereby pressed by the inclined side face 34a of the chuck head 34 and forced out along the surface 31c. As a result, the diameter of the chuck ring 35 is enlarged over and in parallel to the base of the stepped-down portion 31b of the turntable 31 where the disk is chucked. The chuck head 34 then stops to move down as shown in the left half portion of FIG. 2. In this condition, the inclined side face 34a of the chuck head 34 is situated above the inclined side face 35d of the chuck ring 35 and the inclined side face 34a becomes unremovable from the inclined side face 35d. At this time, the leading end of the chuck ring 35 is caused to protrude up to the position above the stepped-down portion 31b as its diameter enlarges. FIG. 4 is an enlarged sectional view of the chuck ring 35 in the condition above. As shown in FIG. 4, the inclined inner peripheral side face 35d of the chuck ring 35 conforms in an angle of inclination to the inclined side face 34a of the chuck head 34 contacted therewith.

FIG. 4 shows the condition in which the inclined side face 34a of the chuck head 34 becomes mated with the inclined side face 35d of the chuck ring 35 and the chuck ring 35 is pressed by the inclined side face 34a. The diameter of the chuck ring 35 is thus enlarged and the disk 2 is kept chucked. As shown in FIG. 4, the inclined base P of the chuck ring 35 presses the inner periphery 2a (to be pressed) of the disk 2 in the direction perpendicular to the inclined base P to chuck the disk 2 in between the stepped-down portion 31b and the base of the chuck ring. Simultaneously, the disk 2 is properly positioned because of the presence of the step 31a.

On the other hand, the disk 2 is released by inversely moving up the chuck head 34 by elevating the operating shaft 32. As the chuck head 34 is elevated, the action of the steel ring 35b makes the diameter of the chuck ring 35 return to the original measurement; the right half portion of FIG. 2 illustrates this condition.

As shown in FIG. 4, the depth of the step 31a is rendered slightly smaller than the thickness of the disk 2. Moreover, the inclined base P of the chuck ring 35 is substantially in contact with the inner periphery 2a of the disk 2. In this case, the surface 31c on which the chuck ring 35 is mounted may be slightly inclined along the direction in which the chuck ring 35 expands, wherein the depth of the step 31a may be substantially equal to the thickness of the disk 2. This is because the inclined portion of the base P of the chuck ring 35 is set lower than the inclined surface 31c. The inner periphery 2a of the disk 2 can thus be chucked.

FIGS. 6(a), 6(b) and 6(c) show an example in which the chuck ring 35 has been replaced with a member incorporating a chuck ring unit. This chuck member is formed by dividing a cylindrical member into a plurality of parts along the axial direction.

As shown in FIG. 6(c), a chuck member 25 is formed by quartering a cylindrical body having an outward flange on top of the member and an inward flange at the bottom thereof. In other words, each quarter has an outward flange 251 at the upper end and an inward flange 252 at the lower end, the outward flange 251 forming a chuck pawl 25a serving as a pawl for chucking.

A guide groove 253 is formed in the rearward base of the upper outward flange 251 and an O-ring 28 (see FIGS. 6(a) and 6(b)) as will be described later is fitted into the guide grooves 253. The O-ring 28 thus fitted into the guide grooves 235 biases the outward flange 251 of each chuck pawl 25a centripetally. As a result, like the aforementioned chuck ring 35, the outward flanges 251 are biased in the direction in which the diameter formed thereby contracts. The O-ring 28 acts as what is compared to the steel ring 35b of the chuck ring 35. As far as the operation of the chucking the disk 2 is concerned, the four outward flanges 251 of the chuck member 25, like the chuck ring 35, serve to chuck the disk 2. However, the mechanism of the chuck member 25 is more or less different from that of the chuck ring 35.

FIGS. 6(a) and 6(b) are sectional views of the chuck member 25 with the O-ring 28 fitted into the guide grooves 253.

A chuck cylinder 21 is a chuck member on one side equivalent in function to the chuck table 31. Although a coil spring 23 in this embodiment corresponds to the coil spring 33, it is not disposed in the rear of the spindle motor 4 but in the chuck cylinder 21. For this reason, an operating shaft in this embodiment is slightly different in construction from the operating shaft 32 of FIG. 2. The operating shaft 22 consists of shaft portions 22a, 22b with a collar 22c therebetween. The chuck cylinder 21 is also provided with a protrusion 21a for use in receiving the spring 23, the protrusion being protruded from the wall surface of the chuck cylinder 21. The shaft portions 22a, 22b constituting the operating shaft 22 may be coupled detachably in a screw-in fashion, for instance.

FIG. 6(a) refers to a case where the operating shaft 22 has been elevated (with the disk released), whereas FIG. 6(b) refers to another where it has been lowered (with the disk chucked).

A chuck head 24 corresponds in function to the chuck head 34, thus having an inclined side face 24a and moreover the upper shaft portion 22a in this embodiment corresponds to the cylindrical portion 34b.

In this case, the diameter of the hollow space of the chuck cylinder 21 is set smaller than the outer diameter formed with the outward flanges 251 of the chuck member 25 but greater than the diameter of the external shape of the cylindrical body. As shown in FIGS. 6(a) and 6(b), the chuck member 25 is inserted and disposed in the hollow space 29 partitioned by the protrusion 21a.

In the hollow space 29, a cylindrical pawl stopper 27 is fitted to the shaft portion 22a of the operating shaft 22 as a sleeve. The bottom of the pawl stopper 27 mounted on the surface of the protrusion 21a and supported thereby. In addition, there is provided an opening 271 for receiving the respective inward flanges 252 above the pawl stopper 27. A coil spring 26 for forcing up the chuck member 25 is fitted to the exterior of the pawl stopper 27.

The fitting of the chuck member 25 into the hollow space 29 is carried out by inserting the inward flanges 252 of the chuck pawls 25a into the opening 271 as shown in FIG. 6(a) after the chuck head 24 is released from mating with the operating shaft 22. At this time, the coil spring 26 is located under the inward flanges 252. Then the chuck head 24 and the operating shaft 22 are integrally assembled as illustrated. The chuck head 24 and the operating shaft 22 are detachably coupled in a screw-in fashion.

When the operating shaft 22 is elevated against the biasing force of the spring 23 in the assembled condition of FIG. 6(a), the inward flanges 252 are kept lightly pushed up from below by the coil spring 26. Each of the chuck pawls 25a is retained in the upper portion of the opening 271 and prevented from moving up therefrom. Consequently, the diameter formed by the outward flanges 251 contracts in such a manner as to let the outward flanges contact the shaft portion 22a of the operating shaft 22 because of the action of the O-ring 28.

When the operating shaft 22 is lowered by the biasing force of the coil spring 23, on the other hand, the coil spring 26 is compressed as shown in FIG. 6(b) and the inner upper portions of the outward flanges 251 come in contact with the inclined side face 24a of the chuck head 24, whereby the diameter formed by the outward flanges 251 enlarge against the biasing force of the O-ring 28. The pressing underside 24b of the chuck head 24 also comes in contact with the top surfaces of the outward flanges 251 and presses the outward flanges down. The inner periphery 2a of the disk 2 is thus pressed and chucked.

In this embodiment, the cylindrical chuck member 25 having the four pawls and the cylindrical pawl stopper 27 are employed, whereas the basic portion of each pawl is in the form of a ring. The inclined side face of the chuck head and the biasing member disposed on the ring-like pawls act as those serving to retract/maintain the pawls; these are of not link construction pivotally supported by pins or the like. Accordingly, the chuck mechanism can be made compact as the members constituting it are readily reducible in size.

With this arrangement, the disk chuck mechanism according to the present invention is therefore made simpler in construction and easier to operate than the prior art mechanism. Not only a large diameter disk but also a smaller diameter one, to say nothing of a small magnetic disk having an outer diameter of 65 mm, can also be chucked in one stroke operation of the operating shaft with certainty and the force uniformly applied to the substantially whole inner periphery thereof. The chuck mechanism in a disk drive of magnetic disk test equipment can thus be made compact.

Although a description has been given with magnetic disks as examples in the embodiment shown, the present invention is needless to say applicable to chuck mechanisms for chucking various disks including hard magnetic disks, flexible magnetic disks and optical disks.

What is claimed is:

1. In a data recording disk chuck mechanism comprising a first chuck member having a stepped-down portion on its outer periphery, said stepped-down portion being used for receiving an inner periphery of a disk along an opening provided in the central part thereof, a spindle coupled to said first chuck member and used for driving said first chuck member to rotate, and an operating shaft passed through the central part of said spindle and that of said first chuck member in such a manner that said operating shaft is movable in the axial direction, said chuck mechanism further comprising a chuck head fixed to the leading end of said operating shaft passed through said first chuck member, said chuck head having a maximum diameter smaller than the diameter of the opening provided in the central part of said disk and having an outer periphery opposite to said first chuck member, said outer periphery being inclined so that the diameter thereof decreases in the direction of said first chuck member, a biasing member for biasing said chuck head to make an inclined side face of said outer periphery move toward said first chuck member, and a second chuck member disposed between said first chuck member and said chuck head, said second chuck member having a cut in part and containing at least a ring part whose diameter enlarges outwardly with respect to its axis on mating with said inclined side face of said chuck head to receive pressure therefrom correspondingly when said chuck head is biased to moved onto said first chuck member, said ring part being kept biased in the direction in which its diameter contracts, characterized in that the inner periphery of said disk is chucked in between said ring part of said second chuck member and said stepped-down portion of said first chuck member when said second chuck member moves up to a position where said second chuck member is positioned opposite to said stepped-down portion of said first chuck member as the diameter of said ring part enlarges.

2. A data recording disk chuck mechanism as claimed in claim 1, wherein said disk is a magnetic disk, wherein said second chuck member is a ring member having a cut in part and wherein the inner periphery of said magnetic disk is held in between the underside of said second chuck member and the base of said stepped-down portion.

3. A data recording disk chuck mechanism as claimed in claim 1, wherein said disk is a magnetic disk and wherein said ring part has a plurality of separate outward pawls.

4. A data recording disk chuck mechanism as claimed in claim 1, wherein said operating shaft is passed through and projected from a spindle motor, and biased by a coil spring fitted in between said operating shaft and the spindle of said spindle motor.

5. A data recording disk chuck mechanism as claimed in claim 4, wherein said ring member is a cylindrical member quartered in the axial direction, each having a ring-like pawl in part and wherein a magnetic disk is chucked between said pawls and said stepped-down portion.

6. In a data recording disk chuck mechanism comprising a chuck member having a stepped-down portion on its outer peripheral surface, said stepped-down portion being used for receiving an inner periphery of a disk along an opening provided in the central part thereof, a spindle coupled to said chuck member and used for driving said chuck member to rotate, and an operating shaft passed through the central part of said spindle and that of said chuck member in such a manner that said operating shaft is movable in the axial direction, said chuck mechanism further comprising a chuck head fixed to the leading end of said operating shaft passed through said chuck member, said chuck head having a maximum diameter smaller than the diameter of the opening in the central part of said disk and having an outer periphery opposite to said chuck member, said outer periphery being inclined so that the diameter thereof decreases in the direction of said chuck member, a biasing member for biasing said chuck head to make an inclined side face of said outer periphery move toward said chuck member, and a ring member disposed between said chuck member and said chuck head and having a cut in part, said ring member being such that its diameter enlarges in the direction opposite to the stepped-down portion of said chuck member outwardly with respect to its axis on mating with said inclined side face to receive pressure therefrom correspondingly when said chuck head is biased to moved onto said chuck member, said ring member being kept biased in the direction in which its diameter contracts, characterized in that the inner periphery of said disk arranged in said stepped-down portion of said chuck member is held between the side face of said ring member opposite to said chuck member and said stepped-down portion as the diameter of said ring member enlarges.

7. A data recording disk chuck mechanism as claimed in claim 6, wherein the depth of a difference in level from said stepped-down portion is smaller than the thickness of said disk.

8. A data recording disk chuck mechanism as claimed in claim 7, wherein said disk is a magnetic disk and wherein said ring member is provided with a similar ring-like elastic material having a cut in part.

9. A data recording disk chuck mechanism as claimed in claim 8, wherein said ring member has a first inclined side face mating with the inclined side face of said chuck head, the inclination of the former conforming to that of the latter, and wherein an angle on the leading end side opposite to the surface of said chuck member on the opposite side of said first inclined side face conforms to a second inclined side face of said ring member.

10. A data recording disk chuck mechanism as claimed in claim 9, wherein the inclined side face of said chuck head having the smallest diameter consecutively abuts on a cylindrical portion having a diameter equal to said smallest diameter, said cylindrical portion being fitted with said ring member.

11. A data recording disk chuck mechanism as claimed in claim 8, wherein said operating shaft is passed through and projected from a spindle motor, and biased by a coil spring fitted in between said operating shaft and the spindle of said spindle motor.

* * * * *